United States Patent [19]

Ichihara et al.

[11] Patent Number: 4,903,868
[45] Date of Patent: Feb. 27, 1990

[54] VISCOUS FLUID DISPENSER

[75] Inventors: Takashi Ichihara, Kanagawa; Akiyoshi Umehara; Shigeo Iizuka, both of Chiba; Tadao Saito, Tokyo, all of Japan

[73] Assignees: Lion Corporation; Yoshino Kogyosho Co., Ltd., Tokyo, Japan

[21] Appl. No.: 216,299

[22] Filed: Jul. 8, 1988

[30] Foreign Application Priority Data

Jul. 8, 1987 [JP] Japan .......................... 62-104725[U]

[51] Int. Cl.⁴ .......................... G01F 11/00; B67D 5/42
[52] U.S. Cl. .................................. 222/256; 222/259; 222/383; 222/387
[58] Field of Search ............... 222/207, 209, 212, 256, 222/257, 259, 260, 341, 380, 383, 386, 387

[56] References Cited

U.S. PATENT DOCUMENTS

| | | | |
|---|---|---|---|
| Re. 31,408 | 10/1983 | Czech et al. | 222/341 |
| 3,268,123 | 8/1966 | Spatz | 222/259 |
| 4,301,948 | 11/1981 | Czech et al. | 222/341 |
| 4,511,068 | 4/1985 | Bossina | 222/257 |
| 4,643,337 | 2/1987 | Heck et al. | 222/336 |
| 4,651,904 | 3/1987 | Schuckmann | 222/207 |
| 4,685,594 | 8/1987 | Czech | 222/257 |

*Primary Examiner*—Joseph J. Rolla
*Assistant Examiner*—Steven M. Reiss
*Attorney, Agent, or Firm*—Oblon, Spivak, McCelland, Maier & Neustadt

[57] ABSTRACT

A viscous fluid dispenser having a significant decrease in the number of parts constituting the dispenser and thus having a simplified structure which can be easily assembled and which can function satisfactorily is provided. A first embodiment of the dispenser includes only five parts: a cylindrical body integrally formed with a top plate, a movable bottom lid slidably fitted in a lower end of the cylindrical body, a piston slidably fitted in a cylinder of the top plate and having a discharge pipe, a push button having a discharge nozzle connected to the discharge pipe, and a spring for upwardly forcing the push button and piston. A first check valve for operating a suction hole of the top plate is integrally formed in the top plate, and a second check valve for operating the discharge pipe is integrally formed in the piston.

12 Claims, 3 Drawing Sheets

VISCOUS FLUID DISPENSER

BACKGROUND OF THE INVENTION

1. Field of the Invention

This invention relates to a viscous fluid dispenser, and more particularly to a viscous fluid dispenser which is adapted to dispense a desired mount of viscous fluid such as toothpaste through a nozzle therefrom by means of a pumping mechanism incorporated therein.

2. Description of the Prior Art

A conventional dispenser for dispensing viscous fluid such as toothpaste is generally constructed in such a manner as shown in FIG. 1. More particularly, the conventional dispenser includes a cylindrical body 100 opened at upper and lower ends thereof, a movable bottom lid 102 liquid-tightly slidably fitted in the lower open end of the cylindrical body 100, a partition plate 104 arranged so as to close the upper open end of the cylindrical body 100 and formed with a suction hole 106, an elastic dome member 108 provided above the partition plate 104 in a manner to cover the partition plate 104, and a cap 110 threadedly fitted in the upper end of the cylindrical body 100 so as to cover the dome member 108 and formed on a side thereof with a discharge port 112. The dome member 108 has a dome chamber defined therein, and the cap 110 has a push button 114 formed on an upper portion thereof for pushing the dome member 108. The dispenser also includes a fixing plate 116 formed with a first opening 118 communicated with the suction hole 106 of the partition plate 104 and serving as an entrance to the dome chamber of the dome member 108 and a second opening 120 communicated to the discharge port 112 of the cap 110 and serving as an exit of the dome chamber of the dome member 108. The fixing plate 116 acts to fixedly mount the dome member 108 in the cap 110. Further, the dispenser includes a valve mechanism which comprises a valve body 122, a first check valve 124 arranged at the first opening 118 of the fixing plate 116, and a second check valve 126 arranged at the second opening 120, each formed integral with the valve body 122. In addition, the dispenser includes a stopper 128 for closing the discharge port 112 of the cap 110 and an overcap 130 for covering the cap 110.

In the conventional viscous fluid dispenser constructed as described above, the overcap 130 is removed. Then, when the elastic dome member 108 is pressed by pushing the push button 114 and then releasing the push button 114 from the pressing, a negative pressure is applied to an interior or the dome chamber for the dome member 108 to open the first check valve 124, resulting in a predetermined amount of toothpaste being supplied from the cylindrical body 100 through the suction hole 106 to the dome chamber of the dome member 108. This causes a negative pressure to be applied to the interior of the cylindrical body 100, so that the bottom lid 102 may be slidably raised. Then, repushing of the push button 114 causes the second check valve 126 to be opened while keeping the first check valve 124 closed, resulting in the toothpaste supplied to the dome chamber of the dome member 108 being discharged through the discharge port 112.

Unfortunately, as is apparent to those skilled in the art from the foregoing, the conventional viscous fluid dispenser has the disadvantage of requiring a large number of parts, resulting in it being complicated in construction and being troublesome to assemble.

Accordingly, it would be highly desirable to develop a viscous fluid dispenser which is capable of being simplified in construction, thus significantly decreasing the number of parts required and being readily assembled.

SUMMARY OF THE INVENTION

Generally speaking, in accordance with the present invention, a viscous fluid dispenser is provided. The dispenser includes a cylindrical body for storing viscous fluid therein which is opened at upper and lower ends thereof. The cylindrical body is integrally formed with a top plate for closing the upper open end. In the cylindrical body is fluid-tightly and slidably fitted a movable bottom lid through the lower open end of the cylindrical body. The top plate is formed at a substantially central portion thereof with a suction hole and is integrally formed with a first check valve which is arranged at the suction hole. Also, the top plate is formed thereon with an upwardly extending cylinder in a manner to surround the suction hole. The dispenser also includes a piston fluid-tightly and slidably fitted in the cylinder of the top plate. The piston is formed at a substantially central portion thereof with a discharge pipe communicated with the cylinder of the top plate, which is provided with a second check valve to selectively close the discharge pipe. The second check valve is formed integral with the piston. On the piston is mounted a push button which has a discharge nozzle connected to the discharge pipe of the piston. The dispenser further includes a spring stretchedly arranged between the push button and the top plate to constantly upwardly force the push button and piston.

The dispenser of the present invention may be so constructed that the discharge nozzle is arranged on an edge of the push button in a manner to be deviated from the center of the push button. In this instance, an interposition element is arranged in the push button which defines, between the interposition element and the push button, a communication passage horizontally extending from the push button to the discharge nozzle through which connection between the discharge pipe of the piston and the discharge nozzle of the push button is accomplished.

It is a principal object of the present invention to provide a viscous fluid dispenser which has a significant decrease in the number of parts thereof.

It is another object of the present invention to provide a viscous fluid dispenser which has a simplified structure.

It is a further object of the present invention to provide a viscous fluid dispenser which can be easily assembled and which can function satisfactorily.

It is still another object of the present invention to provide a viscous fluid dispenser which can be manufactured at low cost and which can be easily maintained.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, wherein.

DETAILED DESCRIPTION OF THE PREFERRED EMBODIMENTS

Figure 1:
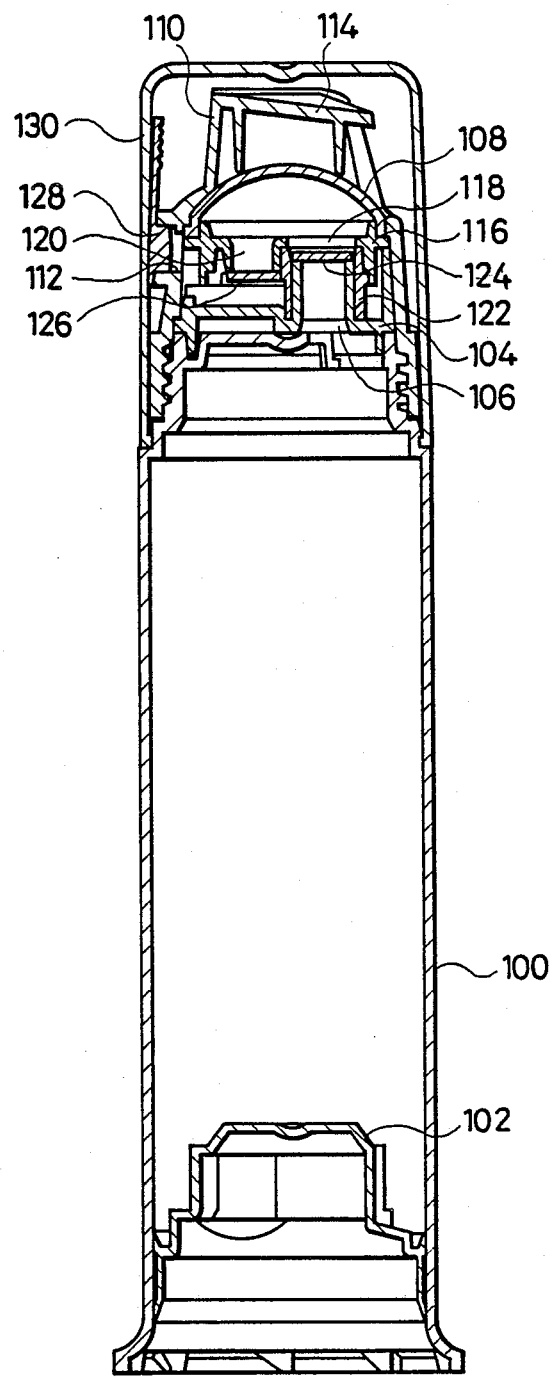
FIG. 1 is a vertical sectional view showing a conventional viscous fluid dispenser.

Now, a viscous fluid dispenser according to the present invention will be described hereinafter with reference to FIGS. 2 and 3, wherein like reference numerals designate corresponding parts throughout.

The First Embodiment

Figure 2:
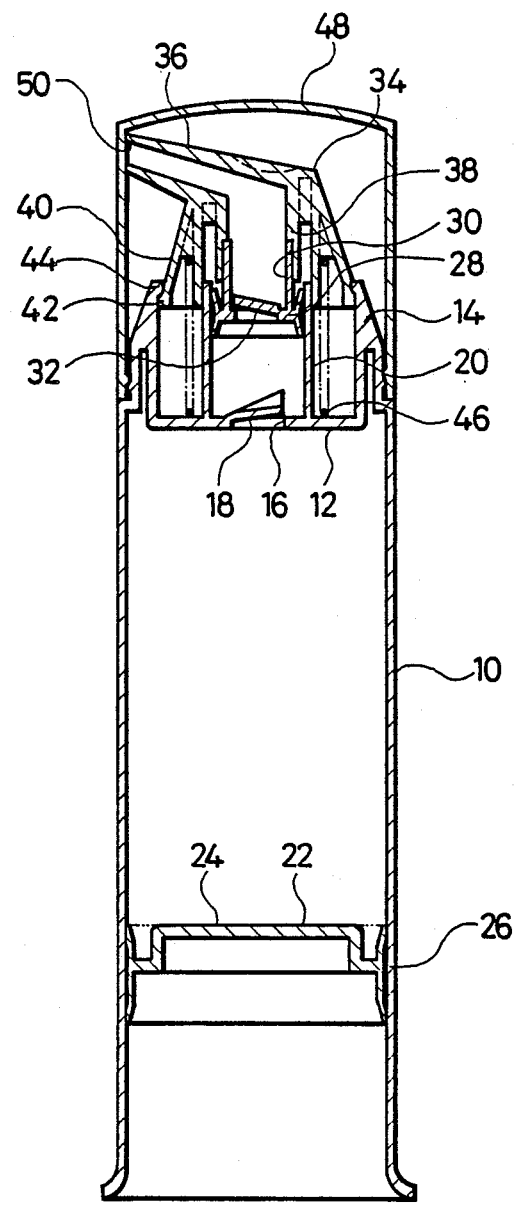
FIG. 2 is a vertical sectional view showing a first embodiment of a viscous fluid dispenser according to the present invention.

FIG. 2 shows a first embodiment of a viscous fluid dispenser according to the present invention. The viscous fluid dispenser of the first embodiment includes a cylindrical body 10 which is closed at an upper end thereof with a top plate 12 and opened at a lower end thereof and serves as a container for storing viscous fluid such as toothpaste therein. In the illustrated embodiment, the cylindrical body 10 is formed integral with the top plate 12 through a peripheral wall 14 integrally formed on a periphery of the top plate 12 in a manner to be raised therefrom or upwardly extend therefrom. The peripheral wall 14 serves as both an outer peripheral wall of the top plate 12 and an inner peripheral wall of the cylindrical body 10. The top plate 12 is formed at a substantially central portion thereof with a suction hole 16, at which a first check valve 18 is arranged. In the illustrated embodiment, the first check valve 18 is formed integral with the top plate 12. Also, the top plate 12 has provided thereon a cylinder 20 in a manner to surround the suction hole 16. In the illustrated embodiment, the cylinder 20 is formed integral with the top plate 12 into substantially the same height as the peripheral wall 14. Such construction permits the cylindrical body 10, the top plate 12, the first check valve 18, and the cylinder 20 to be concurrently formed by molding to facilitate manufacturing.

The dispenser shown in FIG. 2 also includes a movable bottom lid 22 which is fluid-tightly or liquid-tightly and slidably fitted in the cylindrical body 10 through its lower open end. The bottom lid 22 comprises a disc 24 and a flange 26 provided on a periphery of the disc 24 so as to be fluid-tightly and slidably contacted with an inner surface of the cylindrical body 10.

Also, the dispenser includes a piston 28 fluid-tightly and slidably fitted in the cylinder 20. The piston 28 is provided at a central portion thereof with an upwardly extending discharge pipe 30 which is communicated to the cylinder 20 of the top plate 12. At a lower end or entrance of the discharge pipe 30 is arranged a second check valve 32, which, in the illustrated embodiment, is formed integral with the piston 28. The second check valve 32 serves to selectively close the discharge pipe 30 of the piston 28 to selectively interrupt communication between the discharge pipe 30 and the cylinder 20 of the top plate 12.

To the piston 28 is connected a push button 34 which has a discharge nozzle 36 connected to the discharge pipe 30 of the piston 28. More particularly, the push button 34 includes a connection pipe 38 provided at a central portion of the interior thereof and connected to the discharge pipe 30 of the piston 28. The discharge nozzle 36 is arranged in a manner to obliquely upwardly extend from an upper end of the connection pipe 38 and to connect to the discharge pipe 30 through the connection pipe 38. In the illustrated embodiment, the push button 34 also includes an outer peripheral wall 40 adapted to be slidably fitted in the peripheral wall 14 of the top plate 12 or the cylindrical body 10. The peripheral wall 40 of the push button 34 is formed on an outer peripheral surface of a lower end thereof with an annular projection 42 which is adapted to be engaged with a projection 44 formed on an inner peripheral surface of an upper end of the peripheral wall 14 of the top plate 12 to securely hold the peripheral wall 40 of the push button 34 in the peripheral wall 14 of the cylindrical body 10, to thereby prevent release of the push button 34 from the top plate 12 and therefore from the cylindrical body 10.

Further, in the first embodiment, a coiled spring 46 is vertically stretchedly arranged between the top plate 12 and the push button 34 so that the piston 28 and the push button 34 are constantly forced upwardly.

In addition, the dispenser includes an overcap 48 detachably fitted on the peripheral wall 14 of the top plate 12 or the cylindrical body 10 so as to surround the push button 34 therewith. The overcap 48 and discharge nozzle 36 are so formed that, when the overcap 48 is fitted on the peripheral wall 14, a tip end or discharge port 50 of the discharge nozzle 36 is abutted against an inner surface of the overcap 48, resulting in the discharge port 50's being closed. Such construction eliminates the need to fit the stopper 128 in the discharge port 112, which is required in order to close the port 112 in the conventional dispenser shown in FIG. 1.

Now, the manner of operation of the viscous fluid dispenser of the first embodiment constructed as described above will be described hereinafter.

First, when the push button 34 is pushed against the spring 46 after the overcap 48 is removed, the piston 28 is lowered in the cylinder 20 with downward movement of the push button 34. Then, the push button 34 being released from the pushing, the elastic force of the spring 46 causes the push button 34 to be upwardly moved, so that the piston 28 may be raised while keeping the second check valve 32 closed. This causes a negative pressure to be applied to the interior of the cylinder 20 to open the first check valve 18, resulting in viscous fluid such as toothpaste being supplied from the cylindrical body 10 through the suction hole 16 into the cylinder 20. Concurrently, this causes a negative pressure to be applied to the interior of the cylindrical body 10, so that the movable bottom lid 22 is raised by a distance corresponding to the amount of viscous fluid dispensed to the cylinder 20.

Subsequently, when the push button 34 is pushed again, the first check valve 18 is actuated to close the suction hole 16, and the second check valve 32 is opened, resulting in viscous fluid or toothpaste in the cylinder 20 being outwardly discharged through the discharge pipe 30 and the discharge nozzle 36.

As can be seen from the foregoing, the viscous fluid dispenser of the illustrated embodiment is constituted of only five parts: the cylindrical body 10 provided with the top plate 12, the movable bottom lid 22, the piston 28, the push button 34, and the spring 46. This significantly simplifies the structure of the dispenser and facilitates assembling while causing the dispenser to dispense satisfactorily.

The Second Embodiment

Figure 3:
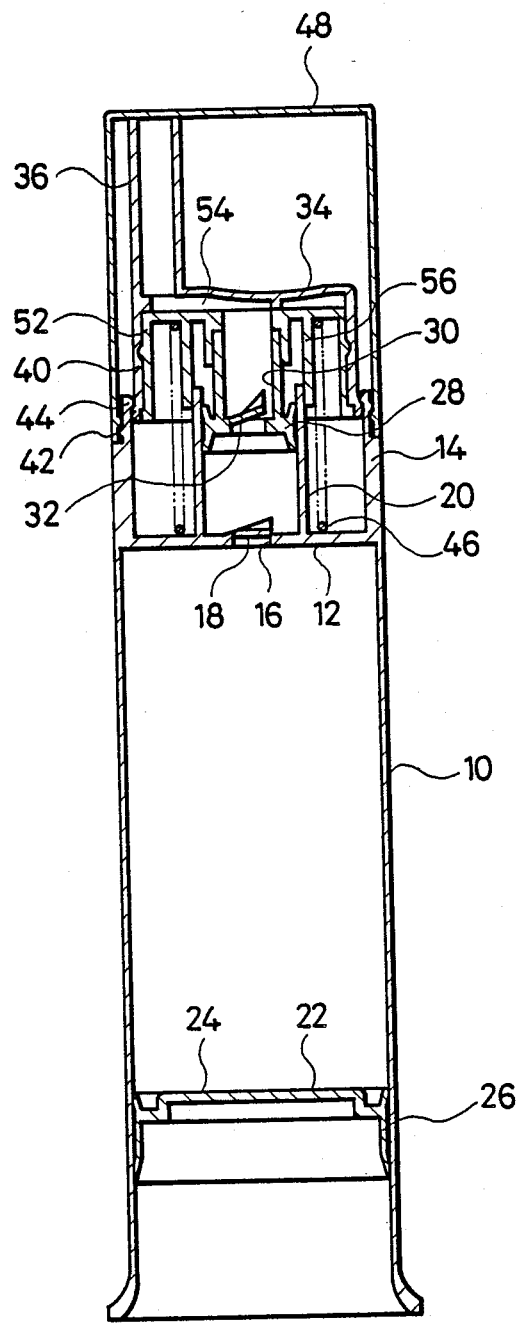
FIG. 3 is a vertical sectional view showing a second embodiment of a viscous fluid dispenser according to the present invention.

FIG. 3 shows a second embodiment of a viscous fluid dispenser according to the present invention.

The embodiment shown in FIG. 2, as described above, is so constructed that the connection pipe 38 is provided at the central portion of the interior of the push button 34, and the discharge nozzle 36 is arranged so to extend obliquely upwardly from the upper end of the connection pipe 38. In the embodiment of FIG. 3, the discharge nozzle 36 is vertically arranged on the edge of the push button 34 in a manner to be deviated from the center of the push button 34. Accordingly, in the second embodiment, it is required to connect the discharge nozzle 36 to the discharge pipe 30. For this purpose, the second embodiment is constructed in such a manner that an interposition element 52 is arranged or fitted in the push button 34 to define a communication passage 54 between the push button 34 and the interposition element 52 so as to horizontally extend from a central portion of the push button 34 to the discharge nozzle 36. Also, the discharge pipe 30 of the piston 28 is connected at an upper end thereof to a substantially central portion of the interposition element 52. The interposition element 52 is provided with a vertically extending guide cylinder 56 fitted on the cylinder 20 or the top plate 12.

The remainder of the second embodiment may be constructed in substantially the same manner as the first embodiment shown in FIG. 1.

As can be seen from the foregoing, the dispenser of the second embodiment has one more part than the first embodiment of FIG. 2.

As is apparent from the foregoing, the viscous fluid dispenser of the present invention has significantly fewer parts constituting the dispenser as compared to the conventional dispenser. Thus, the dispenser of the invention has a simplified structure which can be easily assembled and which can function satisfactorily. Further, the dispenser of the present invention can be manufactured at a low cost and can be easily maintained.

It will thus be seen that the objects set forth above, among those made apparent from the preceding description, are efficiently attained. Since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A viscous fluid dispenser comprising:
   (a) a cylindrical body for storing viscous fluid therein which has upper and lower ends;
   (b) said cylindrical body being integrally formed with a top plate for closing said upper end;
   (c) a movable bottom lid fluid-tightly and slidably fitted in said cylindrical body through said lower end;
   (d) said top plate being formed at a substantially central portion thereof with a suction hole;
   (e) said top plate being integrally formed with a first check valve which is arranged at said suction hole;
   (f) said top plate being formed thereon with an upwardly extending cylinder in a manner to surround said suction hole;
   (g) a piston fluid-tightly and slidably fitted in said cylinder of said top plate above said first check valve;
   (h) said piston being formed at a substantially central portion thereof with a discharge pipe;
   (i) said discharge pipe being provided with a second check valve to selectively close said discharge pipe;
   (j) said second check valve being formed integrally with said piston;
   (k) the inner surface of said cylinder and said first and second check valves defining a metering chamber for the viscous fluid;
   (l) a push button mounted on said piston and having a discharge nozzle; and
   (m) a spring arranged between said push button and said top plate to constantly bias said push button and said piston upwardly.

2. A viscous fluid dispenser as defined in claim 1, wherein said top plate is formed integrally with said cylindrical body through an upwardly extending peripheral wall integrally formed on a periphery of said top plate.

3. A viscous fluid dispenser as defined in claim 2, wherein said push button is engagedly held on said peripheral wall of said cylindrical body to ensure mounting of said push button on said piston.

4. A viscous fluid dispenser comprising:
   (a) a cylindrical body for storing viscous fluid therein which has upper and lower ends;
   (b) said cylindrical body being integrally formed with a top plate for closing said upper end;
   (c) a movable bottom lid fluid-tightly and slidably fitted in said cylindrical body through said lower end;
   (d) said top plate being formed at a substantially central portion thereof with a suction hole;
   (e) said top plate being integrally formed with a first check valve which is arranged at said suction hole;
   (f) said top plate being formed thereon with an upwardly extending cylinder in a manner to surround said suction hole;
   (g) a piston fluid-tightly and slidably fitted in said cylinder of said top plate;
   (h) said piston being formed at a substantially central portion thereof with a discharge pipe;
   (i) said discharge pipe being provided with a second check valve to selectively close said discharge pipe;
   (j) said second check valve being formed integrally with said piston;
   (k) a push button mounted on said piston and having a discharge nozzle;
   (l) a spring arranged between said push button and said top plate to constantly bias said push button and said piston upwardly;
   (m) an interposition element arranged in said push button;
   (n) said discharge nozzle being arranged on an edge of said push button in a manner to be deviated from the center of said push button; and (o) said interposition element defining, between said interposition element and said push button, a communication passage extending horizontally from said push button to said discharge nozzle through which connection between said discharge pipe of said piston and said discharge nozzle of said push button is accomplished.

5. A viscous fluid dispenser as defined in claim 1 and further comprising:
 (a) an overcap for covering said push button;
 (b) said discharge nozzle of said push button being provided at a tip end thereof with a discharge port; and
 (c) said overcap and said push button being so formed that an inner surface of said overcap is abuttedly contacted with said discharge port of said push button to close said discharge port.

6. A viscous fluid dispenser as defined in claim 4, wherein said top plate is formed integrally with said cylindrical body through an upwardly extending peripheral wall integrally formed on a perphery of said top plate.

7. A viscous fluid dispenser as defined in claim 6, wherein said push button is engagedly held on said peripheral wall of said cylindrical body to insure mounting of said push button on said piston.

8. A viscous fluid dispenser as defined in claim 4 and further comprising:
 (a) an overcap for covering said push button;
 (b) said discharge nozzle of said push button being provided at a tip end thereof with a discharge port; and
 (c) said overcap and said push button being so formed that an inner surface of said overcap is abuttedly contacted with said discharge port of said push button to close said discharge port.

9. A viscous fluid dispenser comprising:
 (a) a cylindrical body for storing viscous fluid therein which has upper and lower ends;
 (b) said cylindrical body being integrally formed with a top plate for closing said upper end;
 (c) a movable bottom lid fluid-tightly and slidably fitted in said cylindrical body through said lower end;
 (d) said top plate being formed at a substantially central portion thereof with a suction hole;
 (e) said top plate being integrally formed with a first check valve which is arranged at said suction hole;
 (f) said top plate being formed thereon with an upwardly extending cylinder in a manner to surround said suction hole;
 (g) a piston fluid-tightly and slidably fitted in said cylinder of said top plate;
 (h) said piston being formed at a substantially central portion thereof with a discharge pipe;
 (i) said discharge pipe being provided with a second check valve to selectively close said discharge pipe;
 (j) said second check valve being formed integrally with said piston;
 (k) a push button mounted on said piston and having a discharge nozzle;
 (l) said discharge nozzle being arranged on an edge of said push button in a manner to be deviated from the center of said push button;
 (m) a spring arranged between said push button and said to plate to constantly bias said push button and said piston upwardly;
 (n) an interposition element arranged in said push button; and
 (o) said interposition element defining a communication passage extending horizontally from said push button to said discharge nozzle through which connection between said discharge pipe of said piston and said discharge nozzle of said push button is accomplished.

10. A viscous fluid dispenser as defined in claim 9, wherein said top plate is formed integrally with said cylindrical body through an upwardly extending peripheral wall integrally formed on a periphery of said top plate.

11. A viscous fluid dispenser as defined in claim 10, wherein said push button is engagedly held on said pheripheral wall of said cylindrical body to ensure mounting of said push button on said piston.

12. A viscous fluid dispenser as defined as claim 9 and further comprising:
 (a) an overcap for covering said push button;
 (b) said discharge nozzle of said push button being provided at a tip end thereof with a discharge port; and
 (c) said overcap and said push button being so formed that an inner surface of said overcap is abuttedly contacted with said discharge port of said push button to close said discharge port.

* * * * *